United States Patent Office 3,540,845
Patented Nov. 17, 1970

3,540,845
RAPID FIELD PROCEDURE FOR THE DETERMINATION OF CHEMICAL OXYGEN DEMAND
Charles J. Overbeck, Palos Heights, and James J. Hickey, Chicago, Ill., assignors to Nalco Chemical Company, Chicago, Ill., a corporation of Delaware
No Drawing. Filed May 6, 1968, Ser. No. 727,030
Int. Cl. G01m 21/20, 31/16, 33/18
U.S. Cl. 23—230           2 Claims

ABSTRACT OF THE DISCLOSURE

Method for the determination of COD (Chemical Oxygen Demand) in water by a procedure which reduces time and effort normally required for such an analysis by standard methods. The improvement comprises the use of a novel oxidizing composition. The oxidizing composition consists essentially of an equi-molar solution of sulfuric and phosphoric acid, also containing therein a water-soluble hexavalent chromium salt.

BACKGROUND OF THE INVENTION

Waste control in industrial process waters deserves great concern and attention. Natural water resources require protection from the ever-increasing threat of pollution due primarily to industrial wastes which are discharged into various bodies of water. The first and most effective step in controlling waste discharge is to be aware of the waste content of these discharges. Wastes may be both chemical and biochemical. As a consequence, various parameters and variables must be considered to determine with accuracy the scope of a waste polluted body of water.

Chemical oxygen demand, hereinafter referred to as COD, provides a measure of the organic matter in a sample that is susceptible to oxidation by a strong chemical oxidant and is one parameter which must be considered in determining the overall waste content of a suspected polluted stream of water. COD is calculated as p.p.m. oxygen. The determination of COD is a time consuming technique requiring a knowledge of chemical analytical techniques.

Most types of organic matter are oxidized by a boiling mixture of a strong oxidizing composition, such as a mixture of chromic and sulfuric acids. The amount of oxidizable or organic matter, measured as oxygen equivalent is proportional to the oxidizing agent consumed. A value can therefore be found for the waste organic matter present in the water being tested.

A sample refluxed with known amounts of potassium dichromate and sulfuric acid may be titrated with ferrous ammonium sulfate. The excess dichromate or dichromate which was not consumed due to its oxidation of the organic waste can be determined. This value can in turn be correlated to yield a numerical quantity of waste content.

As a general rule, straight chained, aliphatic compounds, aromatic hydrocarbons, and pyridine are not oxidized to any appreciable extent. As a consequence, other methods have been used to determine their content. One such method comprises the use of X-ray diffraction patterns whereby the number of carbon atoms are determined. This number indicates whether these cyclic compounds are present.

The straight-chained compounds have been more effectively oxidized in the presence of a silver sulfate catalyst. Silver sulfate reacts with chlorides, bromides, or iodides to produce precipitates which are only partially oxidized. There is no advantage in using the catalyst in the presence of aromatic hydrocarbons, but it is essential to the oxidation of straight chained alcohols and acids.

Oxidation difficulties have also been caused due to the presence of chlorides. These difficulties have been overcome by adding mercuric sulfate to water samples before their refluxing. Mercury ties up the chloride ion as a soluble mercuric chloride complex which greatly reduces its ability to react further.

Many methods have been proposed by the prior art in determining COD. However, few approaches allow a rapid determination to be made. Also few techniques are capable of being run and elevated at the sampling site by non-chemically trained operators.

Most prior art methods for determining COD are subject to the following deficiencies:

(1) Require too great a time
(2) Require chemical analytical skill on the part of the operator
(3) The results obtained are not consistent and therefore unreliable.

The present invention solves all of these deficiencies by providing an improved simplified and rapid method for determining COD.

SUMMARY OF THE INVENTION

The method taught by this invention for determining the COD of a given sample of water uses the general procedure steps outlined by the COD procedure in Standard Methods, prepared by American Public Health Assoc., American Waterworks Assoc., Water Pollution Control Fed., 12th Edition, 1965, published by the American Public Health Assoc., Inc., pages 510–514. The Standard Methods procedure is a valuable method that is widely used in analysis of waste waters. That method has many desirable features and offers the advantages of dependability, reproducibility, and efficiency of oxidation. However, the Standard Methods COD test requires two to three hours for completion. The method taught by this invention allows rapid COD determination to be made. One analysis can be completed in less than 30 minutes by an operator who is completely non-skilled in the art of analytical chemistry. The procedure can be successfully applied to a wide variety of waste waters. The method taught uses a mixture of potassium dichromate and equimolar solution of sulfuric and phosphoric acids.

OBJECTS OF THE INVENTION

It is an object of this invention to develop a rapid field COD method which would be generally applicable to a wide variety of organic compounds that would be indicative of the constituents of domestic and industrial waters.

Another object of this invention is to provide a simplified COD test so that it can be run in the field by one experienced in the field of analytical chemistry with minimum amount of time and equipment.

It is further an object of this invention to teach a test procedure which will yield results which are both dependable and reproducible.

INVENTION

The invention utilizes the Standard Methods COD test varying among other conditions, the oxidizing agent composition.

The oxidizing composition as taught by this invention comprises an equimolar solution of sulfuric and phosphoric acid in which there is dissolved a water soluble hexavalent chromate salt and a catalyzing amount of silver sulfate. The concentration of the hexavalent chromate and silver sulfate salts are 0.008 molar and 0.019 molar respectively. The recommended preferable water-soluble hexavalent chromate salt is potassium dichromate. The time required for the Standard Method procedure varies between two and three hours. The time required by the procedure taught by this invention requires 5 to 7 minutes maximum at a temperature of 165° C.±1°.

It is common that certain process waters will contain the chloride ($Cl^-$), ion. The presence of this ion effects the COD determination as taught by this invention. The reason for this effect is that the chloride along with the organic waste would be oxidized by the strong hexavalent chromate salt. Since the waste content is determined by the amount of hexavalent chromate salt remaining in excess, oxidizing of the chloride would introduce error. To prevent this occurrence, mercuric sulfate is added to the water sample which is to be tested. Mercuric sulfate is an excellent complexing agent. The chloride anion is almost entirely complexed with the mercury cation. As a consequence it is not left in solution in a state where it can be oxidized by the chromate salt and therefore introduce error in the determination of the organic waste content of that water.

Water samples which are to be tested may be conveniently collected in 5 milliliter aliquots. The estimated COD of these 5 milliliter aliquots should vary between 10 and 3,000. If the estimated COD is in excess of 3,000 the water samples should be diluted and once again collected in 5 milliliter aliquots so that the estimated COD value is within the range 10–3000.

The titrant taught by this invention is ferrous ammonium sulfate. Other titrants such as sodium thiosulfate cannot be used for direct titration of dichromate because the reaction is not stoichiometric under existing conditions. Arsenious acid and isonicotinic hydrazide both reach stoichiometry with dichromate. On the other hand, a solution of ferrous ammonium sulfate in the presence of cadmium metal will remain stable for a period of approximately four months without any critical change in its normality. Consequently the use of cadmium stabilized ferrous ammonium sulfate as the reducing agent is ideally suitable for a field procedure.

Several redox indicators were examined to determine the most ideal indicator for the COD procedure involving the use of the oxidizing composition taught by this invention. Such indicators as triarylmethane dyes, derivatives of diphenylamine, 5–6 dimethylferroin, α-naphthoflavone and phenylanthranilic, and the like were found to be either insufficiently stable to be used as indicated or having inappropriate oxidation potentials. Ferroin[1] indicator was then tested. It was found that this indicator worked perfectly for the procedure taught by this invention.

The actual procedure taught by this invention is very similar to that expressed in the Standard Methods procedure. However, there are critical differences which render the present invention far superior.

The procedure as taught by the Standard Methods procedure comprises collecting a water sample and adding thereto a sufficient amount of mercuric sulfate so as to complex any chloride present. An oxidizing composition is then added to this water sample. The oxidizing composition consists of sulfuric acid and the hexavalent chromate salt, potassium dichromate. A sufficient quantity of this oxidizing agent is added to the water sample so as to insure complete oxidation of all organic matter which may be present. The addition of the oxidizing composition is accompanied with adequate agitation to insure a proper intermixing of the water sample with the strong oxidizing composition. After the addition of the composition to the water sample, the system is continuously refluxed for a two-hour period. After refluxing the system is cooled to a temperature less than about 40° C. The system is then diluted by the addition of distilled water to 40–50% by volume. An indicator is then added to the system. The system is then titrated with ferrous ammonium sulfate to determine the excess dichromate. A blank run is then conducted substituting distilled water for the water sample. The same steps and procedures are followed and an excess dichromate is obtained. Upon adding these two values it is then arithmetically possible to calculate the chemical oxygen demand.

The procedure taught by this invention is very similar to that given above. However, there are essential improvements which render simplicity and brevity, while maintaining the accuracy of the above procedure. Another advantage of this invention lies in its adaptability to field analysis.

In the procedure taught by this invention, the COD determination is obtained through the use of an oxidizing composition comprising a 50:50 mixture of sulfuric and phosphoric acids with dichromate instead of a 50% solution of sulfuric acid with dichromate. The concentrations on a weight basis of the sulfuric and phosphoric acids used are 96.5% and 85.0% respectively. The oxidizing composition taught by this invention is a much more powerful oxidizing agent than the Standard Methods oxidizing composition.

The improved oxidizing agent of this invention allows refluxing to take place within a shorter period of time. Digestion times were extensively investigated to ascertain the best conditions for reproducibility. It was found that reproducibility relies upon the temperature and duration of heating time.

The temperature used is most critical. In a series of tests, it was ascertained that if the solution was heated to a 165° C.±1° in a 5–7 minute time interval, reproducibility and complete oxidation was obtained. It was discovered if the prescribed temperature was not used, or the time element changed, there was insufficient oxidation of the substrates. If the time required to reach a 165° C., is longer than 7 minutes, there is some decomposition of the dichromate-acid solution resulting in higher COD values. Hence, the time and temperature relationships are essential.

The interference from chlorides introduces error in the Standard Methods procedure and in the procedure taught by this invention in the determination of COD. In the Standard Methods procedure the presence of chlorides in the samples may be overcome by adding mercuric sulfate to the samples before refluxing. This ties up the chloride ion in a soluble mercuric chloride complex which precludes its ability to react unfavorably. In the procedure taught by this invention, oxidation is performed with a more powerful oxidizing composition than that used in other Standard Methods procedure. This prevents complete masking of the chloride with mercuric sulfate.

Studies were conducted to determine what degree of prevention of the oxidation of the chlorides was effected by mercuric sulfate. Standard solutions of the chlorides were prepared ranging in concentration from 0 to 10,000 p.p.m. The COD procedure of this invention was run on the standards. The results resulting therefrom are given below in Table 1.

TABLE 1

[Oxidation of NaCl using a 50:50 by volume mixture of 96.5% by wt. $H_2SO_4$ and 85.0% by wt. $H_3PO_4$ along with 0.050 N $K_2Cr_2O_7$]

| NaCl added, mg./l. | COD found, mg./l. | COD as NaCl, mg./l. | Percent NaCl oxidized |
|---|---|---|---|
| 63 | 0 | 0 | 0 |
| 125 | 15 | 110 | 88 |
| 250 | 26 | 190 | 76 |
| 500 | 39 | 285 | 57 |
| 1,000 | 55 | 402 | 40 |
| 1,500 | 80 | 585 | 39 |
| 2,000 | 90 | 658 | 33 |
| 2,500 | 95 | 695 | 28 |
| 4,000 | 109 | 796 | 20 |
| 5,000 | 117 | 855 | 17 |
| 6,000 | 123 | 900 | 15 |
| 7,000 | 129 | 945 | 14 |
| 8,000 | 134 | 980 | 12 |
| 9,000 | 137 | 1,000 | 11 |
| 10,000 | 138 | 1,010 | 10 |

---

[1] Prepared by dissolving 1.485 g. 1,10-phenalthroline monohydrate, together with 0.695 g. $FeSO_4·7H_2O$ in water, diluting to 100 ml.

It is obvious that although mercuric sulfate substantially reduces chloride interference, it does not completely complex the chloride. As a consequence, it is necessary to apply a correction factor to compensate for the chloride interference. This correction factor is illustrated by the data set forth in Table 2 as given below.

TABLE 2

NaCl correction factor [1]

| NaCl Conc. (mg./l.) | COD correction (mg./l.) |
|---|---|
| 0 | 0 |
| 50 | 0 |
| 100 | 15 |
| 125 | 17 |
| 150 | 19 |
| 200 | 22 |
| 250 | 25 |
| 300 | 27 |
| 350 | 30 |
| 400 | 33 |
| 450 | 35 |
| 500 | 39 |
| 550–650 | 44 |
| 650–750 | 49 |
| 750–850 | 55 |
| 850–950 | 60 |
| 950–1250 | 67 |
| 1250–1550 | 76 |
| 1550–1850 | 84 |
| 1850–2000 | 88 |
| 2000–3000 | 95 |
| 3000–4000 | 105 |
| 4000–6000 | 116 |
| 6000–8000 | 124 |
| 8000–10,000 | 136 |

[1] Computed from oxidation values from Table 1.

EXAMPLE

A typical procedure as taught by this invention involving the determination of the COD content of a water sample is given by the following sequential steps:

(1) Add approximately 0.3 gram of mercuric sulfate to 400 milliliter tall form beaker.

(2) Pipette a 5.0 milliliter aliquot of the sample into the beaker. (For a COD between 10–3000 p.p.m. a 5 milliliter sample is adequate.) If COD is greater than 3000, make appropriate dilution and pipette 5 milliliters of this dilution for an aliquot. Do not exceed a 5.0 ml. aliquot.

(3) Pipette 50.0 ml. of a dichromate acid oxidizing reaction mixture comprising one liter each of concentrated sulfuric and phosphoric acid, having concentrations on a weight basis of 96.5% and 85.0% respectively, dissolving therein 5 g. $K_2Cr_2O_7$ and 8 g. $Ag_2SO_4$.

(4) Place the beaker on a preheated hot plate and suspend a thermometer in the solution. Heat with frequent swirling so that a temperature of 165° C.±1° is reached between 5–7 minutes. When this temperature is reached within the prescribed time, remove the beaker from the hot plate.

(5) Cool to an approximate temperature less than 40° C.

(6) Cautiously add approximately 200 ml. of distilled water. The rapid addition of water to acid mixture can induce vigorous boiling and spattering.

(7) Add 5 drops of the ferroin indicator and titrate to an orange end point with a 0.05 N ferrous ammonium sulfate solution.

(8) A blank is run by substituting 5.0 milliliters of distilled water for the sample and continuing with steps 3 through 7.

(9) Determine chloride correction factor from Table 2.

(10) Using the formulas given below, calculate the corrected COD:

$$COD\ (mg./l.) = \frac{(a-b)c \times 8000}{ml.\ sample}$$

COD (corrected) = COD − COD (chloride correction factor)

where

COD = chemical oxygen demand
$a$ = ml. $Fe(NH_4)_2(SO_4)_2$ used for blank
$b$ = ml. $Fe(NH_4)_2(SO_4)_2$ used for sample
$c$ = normality of $Fe(NH_4)_2(SO_4)_2$ To compare the accuracy of the present method with the Standard Methods procedure, a group of organic compounds often found as domestic and industrial wastes were prepared in the form of Standard solutions. The Standard Methods procedure and the method of this invention were run and the results compared. Theoretical COD rates were also calculated. The results of this investigation are given below in Table 3.

TABLE 3

[Comparison between Standard Methods and field COD method]

| | COD (mg./l.) | | |
|---|---|---|---|
| Compound | Theoretical [1] | Std. method | Field method |
| Acetic acid | 1,118 | 1,032 | 1,260 |
| Alkyl benzene sulfonate | 1,263 | 1,156 | 1,149 |
| Benzene | 2,700 | 427 | 717 |
| D-glucose | 1,075 | 1,009 | 1,050 |
| Glycine | 1,243 | 1,088 | 1,204 |
| Pyridine | 2,185 | 0 | 121 |
| Monoethanolamine | 1,320 | 1,230 | 1,250 |
| Aniline | 2,570 | 2,500 | 2,540 |
| Toluene | 2,410 | 343 | 360 |
| Ethanol | 1,640 | 1,300 | 1,320 |
| Acetone | 1,750 | 1,750 | 1,750 |
| Methanol | 1,180 | 1,145 | 1,130 |
| Lactose | 1,060 | 1,035 | 1,040 |

[1] Computed using the weight of compound.

The applicability of the procedure taught by this invention to given industrial waste waters arising from various chemical processes is given below. Both the Standard Method and the method of this invention were run on the samples in the same period of time to preclude any error due to changes in the sample upon standing. Results of this investigation can be found in Table 4 as given below.

TABLE 4

[Comparison between Standard Methods and field COD method on waste water samples]

| Sample | Std. method | Field method | Sample characteristics |
|---|---|---|---|
| 1 | [1] 63 | [1] 60 | Raw water. |
| 2 | 20 | 17 | Finished raw water. |
| 3 | 96,000 | 87,100 | Sewage influent. |
| 4 | 52,780 | 49,000 | Do. |
| 5 | 263 | 225 | Papermill wastes. |
| 6 | 6,746 | 6,500 | Papermill effluent. |
| 7 | 0 | 0 | Do. |
| 8 | 2 | 2 | Raw water. |
| 9 | 1,270 | 1,450 | Steel mill oil wastes. |
| 10 | 6 | 4 | River water. |
| 11 | 38 | 42 | Refinery effluent. |
| 12 | 1,240 | 1,115 | Do. |
| 13 | 41,260 | 41,000 | Catcracker water. |
| 14 | 54,400 | 53,250 | Do. |
| 15 | 367 | 340 | Refinery effluent. |
| 16 | 354 | 340 | Sanitary sewage. |
| 17 | 486 | 484 | Do. |
| 18 | 172 | 168 | Do. |
| 19 | 5 | 3 | River water. |
| 20 | 55 | 59 | Latex waste water. |
| 21 | 1,892 | 2,008 | Do. |
| 22 | 172 | 180 | Do. |
| 23 | [1] 77 | [1] 80 | Do. |
| 24 | 48,900 | 51,500 | Micro-bio sample. |
| 25 | 46,400 | 48,000 | Do. |
| 26 | 24,900 | 25,000 | Do. |
| 27 | 121 | 125 | Textile mill wastes. |
| 28 | 55 | 59 | Do. |
| 29 | 478 | 482 | Textile mill effluent. |
| 30 | 2,820 | 2,850 | Acetate sample. |
| 31 | 130 | 133 | Metal processing wastes. |
| 32 | 754 | 760 | Lagoon sludge. |
| 33 | 1,230 | 1,240 | Sewage effluent. |
| 34 | 17,330 | 16,900 | Paper mill waste. |
| 35 | 2,100 | 2,130 | Buchardt settler wastes. |
| 36 | 1,680 | 1,650 | Do. |

[1] Mg./l.

From the results of this investigation, it can be noted that the rapid COD procedure is an efficient and accurate method for determining COD.

The reliability of this method was tested by running a series of COD determinations for blank and replicate samples. The results of these determinations are given below in Table 5.

TABLE 5

[Repeatability of COD method]

| | 0.52 N Fe(NH$_4$)$_2$(SO$_4$)$_2$, ml. | COD, mg./l. |
|---|---|---|
| Blank: | | |
| 1 | 49.20 | |
| 2 | 49.25 | |
| 3 | 49.20 | |
| 4 | 49.20 | |
| Mean | 49.21 | |
| Sample: | | |
| 1 | 36.90 | 1,023 |
| 2 | 37.00 | 1,015 |
| 3 | 37.10 | 1,007 |
| 4 | 37.00 | 1,015 |
| 5 | 37.10 | 1,007 |
| 6 | 37.10 | 1,007 |
| Mean $\bar{x}$, p.p.m. | | 1,012 |

Note.—Standard deviation ±6.5 mg./l., the deviation is ±0.65 percent of the mean.

The mean value of 6 replicates was 1012 p.p.m. With a standard deviation of ±6.5 p.p.m. With the usual statistical theory, this shows a deviation of no greater than 6.5 of the mean can be expected 2 times out of 3. It should be noted that using the procedure taught by the Standard Methods, the deviation was calculated by that reference to be ±8.2. These statistical calculations indicate the procedure taught by this invention gives a more consistent result.

To illustrate the simplicity and continued reproducible results the procedure of this invention was tested by three different analysts who had no previous knowledge or experience with this method. The results achieved by them are given below in Table 6.

TABLE 6

[Reproducibility of COD method]

| Analyst | Standard, mg./l. | | |
|---|---|---|---|
| | 1st | 2nd | 3rd |
| I | 1,005 | 1,009 | 1,014 |
| II | 1,007 | 1,016 | 1,007 |
| III | 996 | 1,005 | 1,008 |

| Sample | Analyst, mg./l. | | | Mean, mg./l. | Standard deviation |
|---|---|---|---|---|---|
| | I | II | III | | |
| A | 588 | 581 | 592 | 587 | ±5.6 |
| B | 112 | 117 | 122 | 117 | ±5.0 |
| C | 73 | 80 | 83 | 79 | ±5.2 |

Note.—Mean $\bar{x}$=1,007 mg./l., standard deviation ±5.8.

These results indicate that one experienced with the COD method taught by this invention can nevertheless utilize such a method to achieve:

(1) reproducible results
(2) facility
(3) rapid results

CONCLUSION

There have been many proposed methods to determine a COD method which would find adaptability in the field. The ideal method would provide for simplicity, accuracy, reproducibility, mobility, and rapidity. None of the current methods have all of these desirable characteristics.

The method taught by this invention does have all of the above listed desirable traits.

Having described my invention, I claim:

1. An improved method for rapidly determining chemical oxygen demand comprising the following sequential steps:

(a) preparing a water sample to be analyzed so that the chemical oxygen demand is within the range of 10–3000 p.p.m. based on 5 ml. of total sample;

(b) adding to said water sample a sufficient amount of mercuric sulfate (HgSO$_4$) to complex chloride (Cl$^-$) present in the water sample;

(c) adding to the water sample as treated in step (b) a dichromate-acid oxidizing reaction mixture comprising an equimolar solution of sulfuric and phosphoric acid, a hexavalent water soluble chromate salt, and a catalyzing amount of silver sulfate (AgSO$_4$) in an amount sufficient to oxidize organic wastes which may be present, said addition being accompanied with adequate agitation to insure proper intermixing of said water sample as treated in step (b) with said dichromate-acid oxidizing reaction mixture, and thereby yield a uniform mixture;

(d) applying heat to said uniform mixture of step (c), accompanied with frequent agitation, so that a temperature of 165° C.±1° is reached within 5–7 minutes, at which time said heat is removed;

(e) cooling said uniform mixture to a temperature less than 40° C.

(f) diluting said uniform mixture by the addition of 40–50%, by volume, distilled water;

(g) adding ferroin indicator to said uniform system;

(h) titrating to an orange end point with ferrous ammonium sulfate, Fe(NH$_4$)$_2$(SO$_4$);

(i) running a blank run by substituting distilled water for said water sample of step (a) and continuing with steps (c) through (h);

(j) arithmetically calculating the chemical oxygen demand by using the following formula:

$$\text{COD(mg./l.)} = \frac{(a-b)c \times 8000}{\text{ml. sample}}$$

where

COD=chemical oxygen demand for dichromate
$a$=ml. Fe(NH$_4$)$_2$(SO$_4$)$_2$ used for blank
$b$=ml. Fe(NH$_4$)$_2$(SO$_4$)$_2$ used for sample
$c$=normality of Fe(NH$_4$)$_2$(SO$_4$)$_2$ (k) correcting for chloride (Cl$^-$) oxidation by using the following formula:

COD (corrected)=COD—COD
(chloride correction factor)

2. The method of claim 1 where the water soluble hexavalent chromate salt is potassium dichromate (K$_2$Cr$_2$O$_7$).

References Cited

Moore, A., et al., Analytical Chemistry, vol. 21, pp. 953–7 (1949).

Moore, A., et al., Analytical Chemistry, vol. 28, pp. 164–7 (1956).

Muers, M. M., communication appearing in Analytical Chemistry, vol. 22, p. 846 (1950).

Ruchhoft, C. C., reply to Muers communication, appearing on same page Standard Methods for the Examination of Water and Waste Water, 12th edition, pp. 510–513, published by American Public Health Assoc. (1965).

JOSEPH SCOVRONEK, Primary Examiner

E. A. KATZ, Assistant Examiner

U.S. Cl. X.R.
252—186, 408